UNITED STATES PATENT OFFICE.

WINFRID HENTRICH AND MAX HARDTMANN, OF WIESDORF-ON-THE-RHINE, AND RUDOLF KNOCHE, OF LEVERKUSEN-ON-THE-RHINE, GERMANY, ASSIGNORS TO GENERAL ANILINE WORKS, INC., OF NEW YORK, N. Y., A CORPORATION OF DELAWARE.

CONDENSATION PRODUCTS OF THE BENZODIAZINE SERIES AND PROCESS FOR MAKING SAME.

No Drawing. Application filed January 28, 1928, Serial No. 250,333, and in Germany February 3, 1927.

The present invention concerns new condensation products of the benzo-diazine series and the process of producing the same. They most probably have the general formula

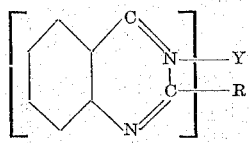

in which Y stands for hydrogen or a hydrocarbon residue, R represents any substituent which is attached to the diazine nucleus with a nitrogen, an organically bound sulfur atom, that means a surfur atom which is attached with two valencies to carbon atoms or an oxygen atom, e. g.—$NH_2$, substituted $NH_2$-groups, the OH-group which may be substituted by an aralkyl or aryl, the SR, or $SO_2R_1$ group wherein $R_1$ stands for an alkyl aralkyl or aryl, and wherein the benzo-diazine may be further substituted in the benzene nucleus.

In accordance with the present invention, appropriate quantities of quinazolines being monohalogenated in a diazine nucleus and wherein the diazine nucleus may be further substituted by a hydrocarbon residue and the benzene nucleus by any substituent, are caused to react with one molecule of such compounds which possess one or more reactive hydrogen atoms attached to a nitrogen, a sulfur atom which is attached to a C-atom with one valency or an oxygen atom in such a manner that while splitting off hydrogen halogenide, the above indicated compounds are produced.

The new condensation products thus obtainable generally are greyish powders which are soluble in water with a yellowish coloration, if they contain an acid group; insoluble in water, if they are free from an acid group. The products find the most varied application as such or after further decomposition for example, as intermediate products in the manufacture of dyestuffs or also for the manufacture of pharmaceutical products.

The following examples will illustrate that part of our invention in accordance with which condensation products of similar constitution are obtained.

*Example 1.*—16.4 parts by weight of powdered 4-chloro-quinazoline of the formula

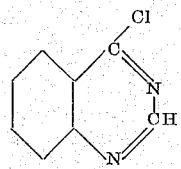

are slowly introduced at 40° C. into a well stirred solution, containing 34.1 parts by weight of the acid sodium salt of 1-amino-8-hydroxy-naphthalene-3:6-disulfonic acid, 700 parts of water and 13.6 parts by weight of crystallized sodium acetate. The condensation begins at once, the solution assuming a yellow coloration; part of the condensation products is precipitated. When the components of the reaction have disappeared, the solution is salted out. The condensation product of the probable formula

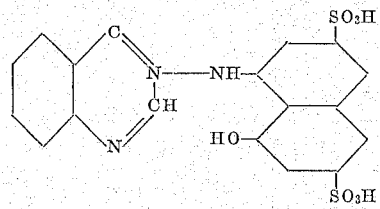

after working up in the customary manner, forms a yellow crystalline powder, which is readily soluble in water after transformation into the sodium salt; its alkaline solutions do not fluoresce. The new compound does not react with nitrous acid.

Instead of 4-chloro-quinazoline, substitution products thereof can be employed, such as 6-methyl-4-chloro-quinazoline of the formula

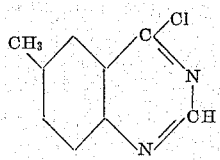

or 8-methyl-4-chloro-quinazoline of the formula

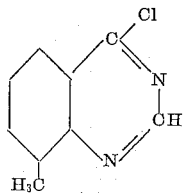

(Compare Gabriel & Colman, Berichte der Deutschen Chemischen Gesellschaft, 38, page 3560), or 2-phenyl-4-chloro-quinazoline of the formula

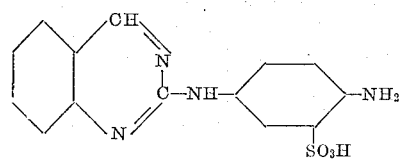

(Compare Finger & Schupp, Journal für praktische Chemie, 74, page 154 and the same, 36, page 155.) The 1-amino-8-hydroxy-naphthalene-3:6-disulfonic acid in the above example can be replaced by any desired other amino-hydroxy-naphthalene-sulfonic acid. Condensation products of the benzodiazine series are thus obtained by this modification, which are only slightly or unessentially different in their properties from the compound, described in Example 1.

If amino-aryl-pyrazolones are employed instead of the amino-hydroxy-napthalene-sulfonic acids, compounds are produced, one molecule of which reacts with one molecule of nitrous acid with the formation of a nitroso compound. Thus, for example, the product of the probable formula

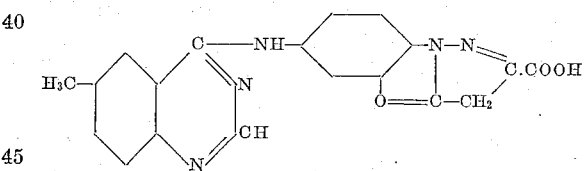

(prepared from 6-methyl-4-chloro-quinazoline and 1-(4'-amino-phenyl)-pyrazolone-(5)-3-carboxylic acid according to the directions given in Example 1.) forms a faintly yellow colored crystalline powder, which dissolves in water with difficulty, but readily in caustic soda solution and which can be salted out from its alkaline solutions; it couples with diazo compounds.

*Example 2.*—16.4 parts by weight of most finely powdered 2-chloro-quinazoline (see for example Berichte der Deutschen Chemischen Gesellschaft 29, 313) are introduced at 60° C. into a solution of 18.8 parts by weight of 1:4-phenylenediamine-3-sulfonic acid and 13.6 parts by weight of sodium acetate in 700 parts of water. Heating is effected slowly to 80–90° C. while stirring well until the condensation is completed. By evaporation and salting out the compound:—

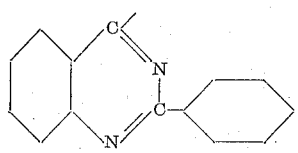

is obtained, which when dry forms a greyish yellowish powder which is readily soluble in alkalies. The new compound is capable of being diazotized, its diazo compound can easily be salted out.

Instead of 2-chloro-quinazoline, its substitution products can be employed, such as for example, 6-methyl-4-phenyl-2-chloro-quinazoline (see Dissertation of Hanschke, Berlin 1899); the 1:4-phenylenediamine-3-sulfonic acid can be replaced by 1:3-phenylenediamine-4-sulfonic acid or by 4:4'-diamino-diphenyl-3-sulfonic acid, or by any desired other amino-sulfonic acid or carboxylic acid of the benzene or naphthalene series or by amino-hydroxy naphthalene sulfonic acids or amino-aryl-pyrazolones; when using the last two components, isomers of the compounds described in Example 1 are obtained, which possess analogous properties, but in general are more readily soluble.

When instead of 2-chloro-quinazoline the 4-chloro-quinazoline employed in Example 1 or its substitution products substituted in the benzene nucleus are condensed with 1:4-phenylenediamine-3-sulfonic acid or similar compounds, the reaction already takes place at 40° C. with the formation of an isomer of the products described in the first section of Example 2.

*Example 3.*—23.9 parts by weight of 2-amino-5-hydroxy naphthalene-7-sulfonic acid and 13.6 parts by weight of crystallized sodium acetate are covered with 700 parts of hot water. The amino-naphthol sulfonic acid is dissolved by the addition of caustic soda solution; the solution should only show quite weakly alkaline reaction. 20.9 parts by weight of 6-nitro-4-chloro-quinazoline are introduced into the well stirred solution at 40° C. The condensation proceeds very quickly accompanied by a yellow coloration of the solution; the condensation product of the probable formula:—

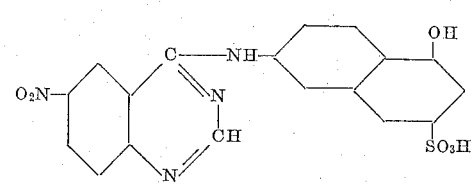

is precipitated in yellow leaflets towards the end of the reaction; on working up, it represents a yellow powder, which is readily soluble in hot water and can be salted out therefrom, it does not react with nitrous acid, and yields on reduction with iron and acetic acid the corresponding amino compound as a grey substance, which can be diazotized and likewise be coupled with diazo compounds.

Instead of 2-amino-5-hydroxy-naphthalene-7-sulfonic acid, other amino-naphthol-sulfonic acids or also amino-aryl-pyrazolones or amino-sulfonic acids or carboxylic acids of the benzene or naphthalene series can be employed. Thus, for example, the compound:—

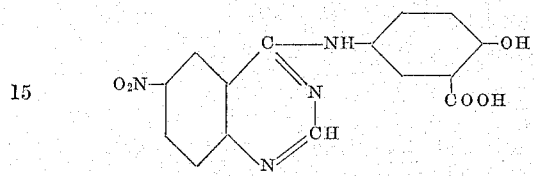

(prepared by condensing one molecule of 4-amino-1-hydroxy-benzene-2-carboxylic acid with one molecule of 6-nitro-4-chloro-quinazoline according to the direction of Example 3) is a grey-yellowish powder, difficultly soluble in water, but easily soluble on heating in the presence of alkalies and can easily be salted out from the solution. On reduction for example, with sodium hydrosulfide the corresponding amino compound is produced as a grey diazotizable powder. Furthermore also more complex amino compounds, such as dehydro-thio-toluidine-sulfonic acids, react smoothly with halogen quinazolines such as 6-nitro-chloro-quinazoline.

In order to prepare the compound:—

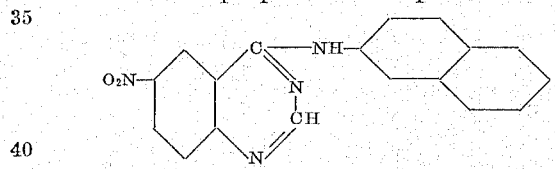

from one molecule of 2-amino-naphthalene and one molecule of 6-nitro-4-chloro-quinazoline the process can also be carried out by heating molecular quantities of both components in the presence of an excess of anhydrous sodium acetate in benzene to 60° C. until 2-amino naphthalene can no longer be detected. The new compound forms a yellowish powder, insoluble in water. Instead of 2-amino-naphthalene, any other desired amines can be used, such as aniline, monomethylaniline, 4-amino-toluene, 2-amino-anisole, 2-amino-phenol, 3-nitraniline, 3-amino-formanilide, 2:6-dichloro-1:4-phenylene-diamine (in which case the diazotizable compounds:—

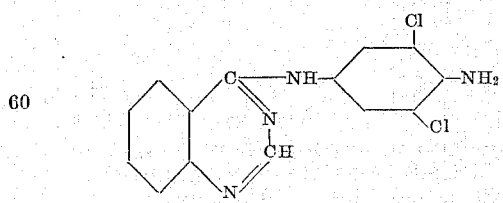

is formed as a yellowish powder), 2-amino-5-hydroxy-naphthalene, 1-amino-7-hydroxy-naphthalene or aliphatic amines.

In order to prepare the compound:—

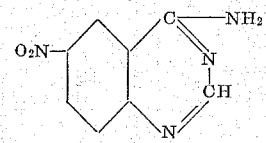

4-chloro-6-nitro-quinazoline is dissolved in benzene, and dry ammonia is passed through the solution with stirring at 50° C. until the presence of chloro-nitro-quinazoline can no longer be detected. The product forms a crystalline yellowish powder, which is soluble with difficulty in most organic solvents.

Example 4.—10.8 parts by weight of 1:4. phenylene-diamine are dissolved in 150 volumes of benzene, 16.4 parts by weight of anhydrous sodium acetate are added and 41.8 parts by weight of 6-nitro-4-chloro-quinazoline are introduced at 50° C. with stirring, whereupon the solution gradually assumes a yellow coloration. The compound thus produced:—

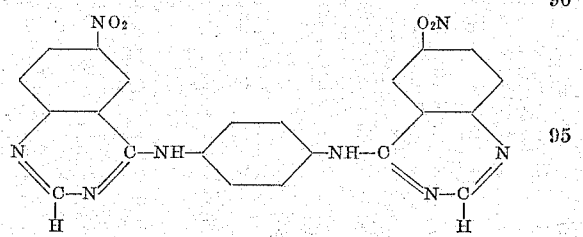

is precipitated as a yellow amorphous powder, which is insoluble in the customary solvents; by reduction, i. e., with stannous chloride in glacial acetic acid suspension, the corresponding tetrazotizable base is obtained.

In this example the 1:4-phenylenediamine can also be replaced by 2:4-diamino-toluene or by naphthylene-diamine. In order to link up ethylenediamine, the process is advantageously carried out in aqueous solution with the employment of the diamine itself as the acid-absorbing agent.

Example 5.—31.9 parts my weight of 1-amino-8-hydroxy-naphthalene-3:6 disulfonic acid are dissolved with 13.6 parts by weight of crystallized sodium acetate in 700 parts of water. 21.4 parts by weight of the linear 4-chloro-naphthodiazine

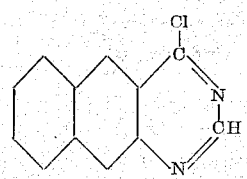

are introduced at 60° C. and the solution is stirred, finally with raising of the temperature to 70° C. until the condensation is completed. The new compound:—

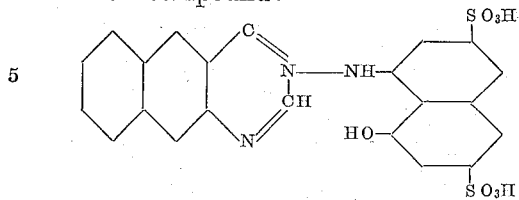

dissolves in hot water with a beautiful yellow coloration; it can be salted out therefrom, but is precipitated at first as a jelly; it couples with one molecule of a diazo compound (for example with diazo benzene) to a reddish violet. The said naphthodiazine can also be condensed under similar conditions with any desired other sulfonated or carboxylated amines or diamines. Unsulfonated amines, such as aniline, 3-nitraniline and the like are condensed advantageously, for example in toluene at 70 to 80° C. with stirring, but otherwise analogously to the process of the second section of Example 3.

*Example 6.*—87.6 parts by weight of 1-(4'-amino-benzoyl)-amino-8-hydroxy-naphthalene-3:6-disulfonic acid and 27.2 parts by weight of crystallized sodium acetate are dissolved in water to a concentrated solution and 32.6 parts by weight of 4:4'-dichloro-6:6'-diquinazolyl (most finely sieved), are added thereto at 50° C.

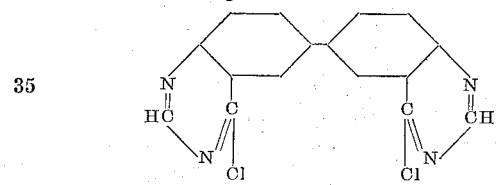

The formation of the compound:—

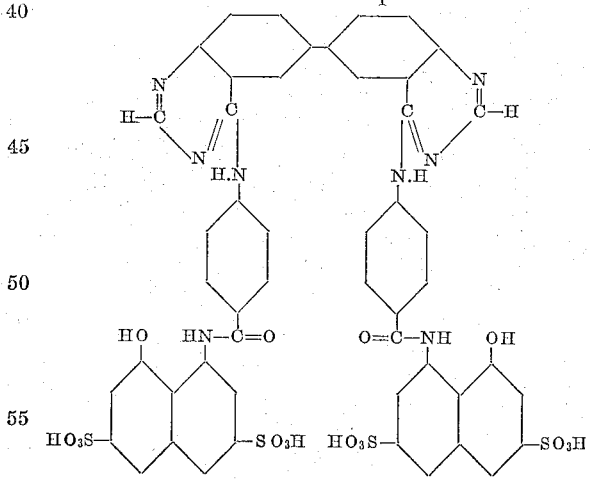

proceeds accompanied by a yellow coloration of the reaction mixture. It is precipitated towards the end of the reaction as a yellow jelly. This can be converted into a condition allowing filtration by prolonged stirring with common salt solution. It forms a yellow powder, soluble in hot water, which on standing in the air darkens somewhat. Instead of 4'-aminobenzoyl-1-amino-8-hydroxynaphthalene-3:6-disulfonic acid, two molecules of any desired other similar or dissimilar amines can be condensed under similar conditions.

*Example 7.*—41 parts by weight of 4-chloroquinazoline and 56 parts by weight of 1-amino-anthraquinone are dissolved in nitrobenzene and heated with or without the addition of an acid-absorbing agent, such as for example, potassium acetate, for several hours to 130° C. On cooling the product is filtered and washed with ether. The new compound:—

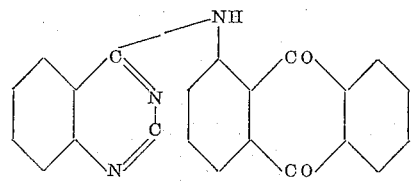

is a reddish-brown powder, which dissolves in sulfuric acid with a yellow coloration. On re-crystallization from glacial acetic acid it melts at 230 to 232° C. (uncorrected).

Other amino anthraquinones can also be condensed with 4-chloro-quinazoline or 2-chloro-quinazoline or derivatives thereof under similar conditions. Thus, for example, the product obtained from two molecules of 4-chloro-quinazoline and one molecule of 1:5-diamino-anthraquinone is a violet black powder, which dissolves in sulfuric acid with a brilliant green coloration and melts above 285° C.

1-amino-5-benzoyl-amino-anthraquinone or similar compounds, as well as amino anthraquinone sulfonic acids can likewise be successfully employed.

*Example 8.*—22.4 parts by weight of the acid sodium salt of 5-sulfino-2-hydroxy-benzoic acid are dissolved in a small quantity of water; 13.6 parts by weight of crystallized sodium acetate are added thereto, then 20.9 parts by weight of finely divided 6-nitro-4-chloro-quinazoline are introduced at 50° C., and the whole is heated with continued stirring, finally to 60° C. until the starting materials have disappeared. After cooling, mineral acid is added until acid reaction appears and a little salt. The new compound of the probable formula:

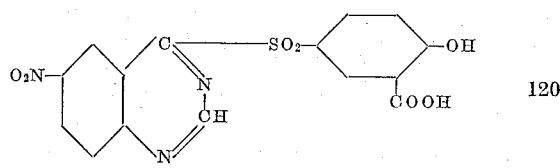

forms a yellowish powder, soluble in hot water; it can be reduced with iron and acetic acid to the corresponding amino compound. After reduction, the reaction mixture is advantageously rendered alkaline with caustic soda while heating, filtered, and the amino compound is isolated from the filtrate by acidifying and concentrating; it forms a grey diazotizable powder.

Two molecules of 6-nitro-4-chloro-quinazoline react in aqueous solution at 30 to 40° C. in the presence of sodium acetate with one molecule of dithioglycol, which is advantageously dissolved in a little alcohol before being added.

The compound thus obtained of the probable formula:—

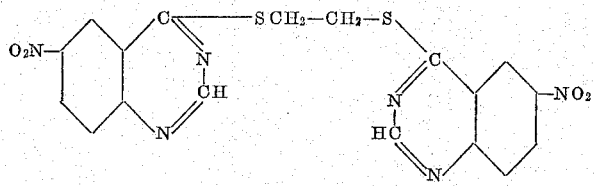

is a yellow powder, insoluble in water.

One molecule of 4-nitro-1-hydroxynaphthalene-5-sulfonic acid can be condensed with one molecule of 6-nitro-4-chloroquinazoline in a quite analogous manner to that described in Example 8; the new compound thus obtained of the probable formula

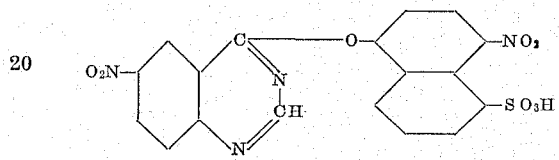

is a yellow crystalline powder, which dissolves in hot water with a yellow coloration and can be salted out therefrom.

Molecular quantities of other mono halogenated quinazolines in which the halogen has entered the diazine ring react in a similar manner with phenols, naphthols, nitrophenols, phenol sulfonic acid, and mercaptans of the aromatic or aliphatic series.

We claim:—

1. The process of producing condensation products of the general formula

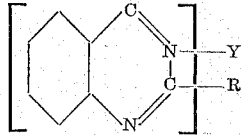

in which Y stands for hydrogen or the residue of a hydrocarbon; R represents any substituent which is attached to the diazine nucleus with a nitrogen or an organically bound sulfur atom or with the oxygen atom of an aryloxy or aralkyloxy residue and wherein the benzodiazine may be further substituted in the benzene nucleus, which process comprises reacting upon a monohalogenated quinazoline and wherein the diazine nucleus may be further substituted by a hydrocarbon residue and the benzene nucleus by any substituent with one molecule of the compound of the general formula HR in which formula H represents a reactive hydrogen and R represents any substituent which is attached to the reactive hydrogen atom with a nitrogen or an organically bound sulfur atom or with the oxygen atom of an aryloxy or aralkyloxy residue.

2. The process of producing a condensation product of the probable formula

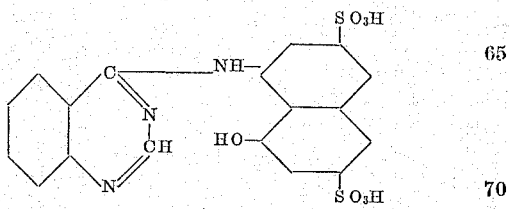

which process comprises reacting upon 4-chloro-quinazoline with 1-amino-8-hydroxynaphthalene-3.6-disulfonic acid.

3. As new products the compounds of the general formula

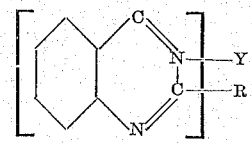

wherein Y stands for hydrogen or the residue of a hydrocarbon; R represents any substituent which is attached to the diazine nucleus with a nitrogen or an organically bound sulfur atom or with the oxygen atom of an aryloxy or aralkyloxy residue wherein the benzodiazine may be further substituted in the benzene, being generally greyish powders soluble in water with a yellowish coloration if they contain an acid group, insoluble in water if they are free from an acid group.

4. As a new product the compound of the probable formula

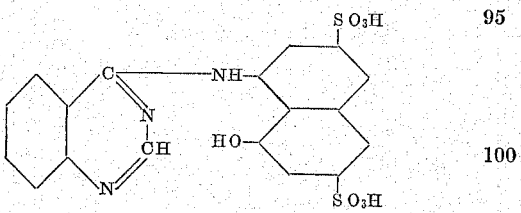

being a yellow crystalline powder, readily soluble in water after transformation into the sodium salt, in alkaline solution exhibiting no fluorescene and not reacting with nitrous acid.

In testimony whereof we have hereunto set our hands.

WINFRID HENTRICH.
MAX HARDTMANN.
RUDOLF KNOCHE.